United States Patent [19]
Nitta et al.

[11] 3,736,440
[45] May 29, 1973

[54] CIRCUIT BREAKER

[75] Inventors: Yoshio Nitta; Nobuaki Kiyokuni; Kikuo Kawasaki, all of Kawasaki, Japan

[73] Assignee: Fuji Denki Seizo Kabushiki Kaisha, Kanagawa-ken, Japan

[22] Filed: Oct. 8, 1971

[21] Appl. No.: 187,783

[52] U.S. Cl. ................................. 307/140, 317/58
[51] Int. Cl. ............................................. H01h 3/26
[58] Field of Search ..................... 307/138, 140, 92, 307/93, 94; 317/36 D, 58, 59, 60; 200/148

[56] References Cited
UNITED STATES PATENTS 3,315,056   4/1967   Furukawa et al. .................... 317/58
3,315,147   4/1967   Cook et al. ............................ 317/58

Primary Examiner—Herman J. Hohauser
Attorney—J. C. Holman et al.

[57] ABSTRACT

Disclosed herein is a circuit breaker comprising as its constructive elements, an insulation transformer adapted to supply an electric power from the ground potential portion to a control device placed on a high potential portion, or a current transformer connected to a line potential portion, a stray capacity of the insulation transformer or current transformer being skillfully utilized whereby measurement or observation of a system voltage can be readily achieved without use of a separate capacitor type potential divider for measuring a voltage between contacts of the circuit breaker.

8 Claims, 16 Drawing Figures

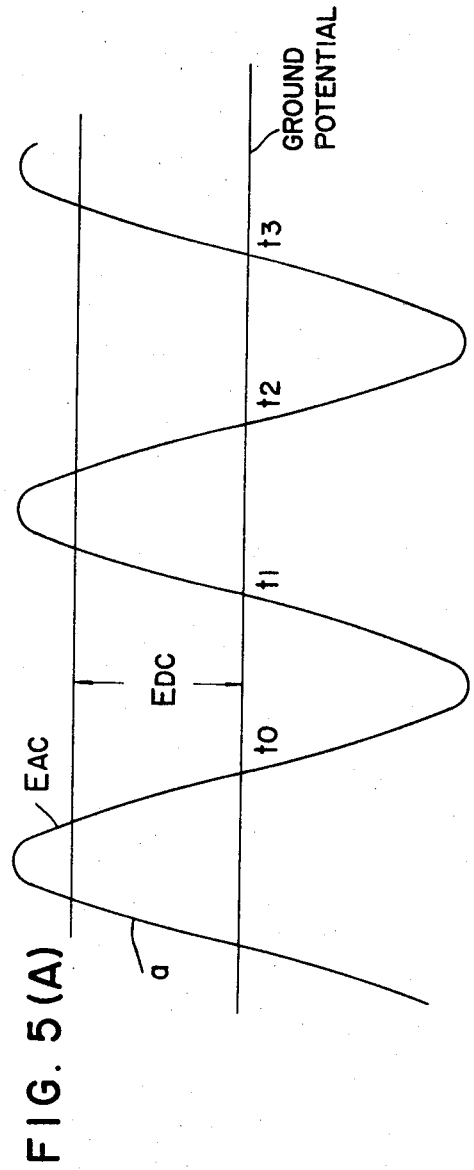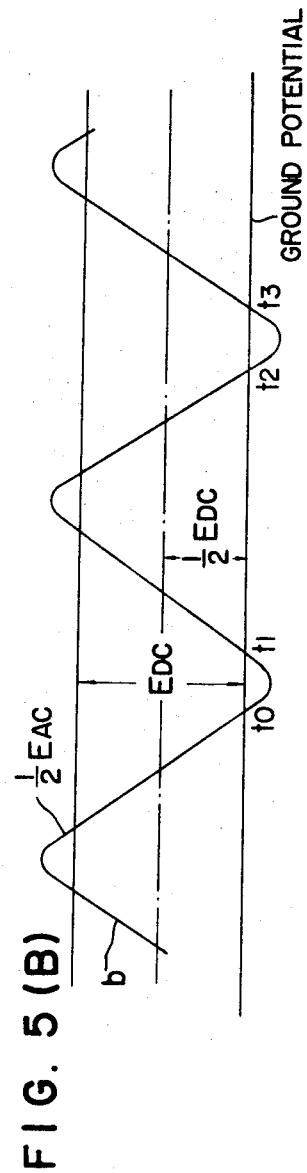
FIG. 5(A)
FIG. 5(B)

CIRCUIT BREAKER

BACKGROUND OF THE INVENTION

The present invention relates to a power circuit breaker, and more particularly to an extra high voltage circuit breaker.

More illustratively, the present invention relates to improvement of the circuit breaker of U.S. Pat. No. 3,315,056. In a line whose voltage is extremely high in the absolute value as found in an extra high voltage transmission line, various types of equipments besides the circuit breaker, such as a potential divider, a current transformer, and the like used for measurement of the system voltage, system current and others, naturally are required electrical insulation equivalent to that required for the circuit breaker. Therefore, they become necessarily large in size and high in cost.

The conventional transmission and distribution networks have been composed by combination of the individual equipments as mentioned above. Therefore, the whole construction expense thereof is so high and the space required for the arrangement of the equipments become necessarily so large.

In addition, a capacitor type potential transformer (which will be abbriviated as P.D.) is, in general, employed for measurement of the line voltage of the extra-high voltage system.

In the circuit breakers mentioned above, it is well known to utilize an electrostatic energy stored in a capacitor for driving a movable electrode of the circuit breaker.

Furthermore, particularly in a circuit breaker used for a system higher than an extra-high voltage system, a synchronous closing method is used so as to suppress a surge voltage in closing the circuit breaker as much as possible. However, the system voltage must be detected by any means in order to carry out the synchronous closing operation.

Heretofore, two separate capacitor type potential transformers are connected at both sides of the circuit breaker, and measurement or observation of the voltage between the contacts is carried out thereby to issue a synchronous closing signal. However, such construction is very high in expense.

SUMMARY OF THE INVENTION

Therefore, the present invention intends to measure an extra-high line voltage without using a separate capacitor type potential transformer, and to provide a novel circuit breaker by which various types of technical problems are solved reasonably.

It is a main object of the present invention to provide a specific circuit breaker by which measurement of a system voltage is achieved through the skillful utilization of one element of the circuit breaker without use of a capacitor type potential transformer for voltage measurement.

Another object of the present invention is to obtain a synchronous control device which controls so as to minimize or eliminate occurrence of an abnormal voltage in a closing operation, by detecting a system voltage or a particular phase of a system voltage.

A further object of the present invention is to provide a circuit breaker suitable for a desired system voltage, by series-connecting a plurality of circuit breaker units, the circuit breaker being closed synchronously with the system voltage by use of a divided voltage obtained from one of the circuit breaker units while the system voltages are measured by use of a divided voltage obtained from the other circuit breaker units.

A still further object of the present invention resides in that the polarity of a residual voltage left on a line side can be detected when the circuit breaker is tripped.

A specific object of the present invention resides in the fact that, in order to eliminate a dangerous condition such that d.c. voltage component included in a divided residual voltage is erroneously discharged by a synchronous control device, and is differed from actual line voltage, a contact is series-connected between one of the terminals of the synchronous control device and divided condenser thereby to avoid a non-synchronous closing operation caused by such erroneous discharging d.c. component voltage.

A more specific object of the present invention resides in the fact that, when the circuit breaker is tripped due to occurrence of short-circuit fault in the electric power transmission, the synchronous reclosing is carried out through at least three kinds of timing elements so that the circuit breaker is reclosed at a specific phase or a specific voltage polarity even if a transmission system frequency is varied on reclosing period.

A still particular object of the present invention resides in that one element constructing the circuit breaker is utilized as a high potential capacitor of a capacitor type potential transformer and to said capacitor a third capacitor is series-connected thereby to complete the capacitor type potential transformer with two different output voltages.

The foregoing objects and other objects as well as the characteristic features of the present invention will become more apparent from the following detailed description and the appended claims when read in conjunction with the accompanying drawings.

BRIEF DESCRIPTION OF THE DRAWING

In the accompanying drawings:

FIGS. 5(A) and 5(B) illustrate waveform for explanation of the present invention;

DETAILED DESCRIPTION OF THE INVENTION

First of all, a principle of the present invention bases will be described to assist in realization of the present invention.

In a circuit breaker according to the present invention, an insulation transformer is provided inside of a supporting porcelain of the circuit breaker in order to supply an electric power from the ground potential portion to a control device placed on a high potential position. Since there is an inherent electrostatic stray capacity between the winding of an insulation transformer, if a certain electrostatic capacity is additionally provided between the ground and one end of the wiring on the ground side, a sort of a capacitor type potential divider is formed.

The present invention is based on the fact mentioned above and intends to readily measure a system voltage.

Figure 1:
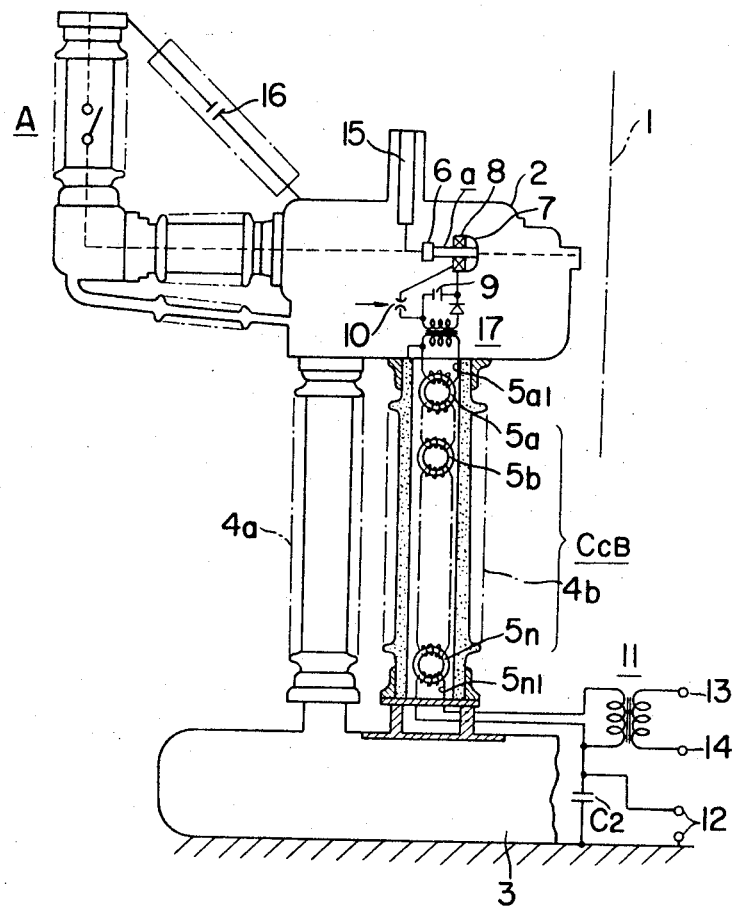
FIG. 1 is a side view of a partially sectioned circuit breaker unit according to the present invention.

Referring now to FIG. 1, shown is one unit of a circuit breaker. The circuit breaker is completed by combining the units having the same construction on the right side of a dot-dash line 1 according to system line voltage.

Hereinafter, described is the switching operation of the circuit breaker. First of all, a contact $a$ is opened in accordance with a tripping signal whereby an arc is produced between the electrodes thereof. After extinguishment of the arc, a contact A is opened with a certain time delay, and then the contact $a$ is closed with a certain time delay again. Therefore, the other units of the circuit breaker positioned on the right side of the dot-dash line 1 also carry out the switching operation in the same way and at the same time.

The contact $a$ is provided inside of a tank type case, or casing 2 on a high potential side, and the casing 2 is supported by two supporting porcelains 4a and 4b standing on a tank 3 placed on a ground potential side. An internal space provided in one (4a) of the supporting porcelains is adapted to be a passage feeding a pressure gas from the tank 3 to the casing 2 and to be a space which guides means transmitting a breaking signal from the ground potential side to the high potential side. Enclosed in an internal space of the other supporting porcelain 4b, is an element necessary for actuating the breaking contact $a$, that is, a cascade connected type insulation transformer 5 which forms a part of the operating circuit. As described in detail in the specification of U.S. Pat. No. 3,315,056, the contact $a$ is provided with a movable contact 7 opposing against a stationary contact 6. A flange is formed on the contact 7 and an electromagnetic coil 8 is provided against the flange. Thus, a capacitor 9 charged through the cascade connected type transformer 5 from the ground potential side is discharged to the electromagnetic coil 8 through a spark gap 10, discharge of which is initiated by the breaking signal, whereby the breaking operation of circuit breaker is abruptly achieved by an electromagnetic repulsive force produced between the coil 8 and the flange of the movable contact 7.

Figure 2:
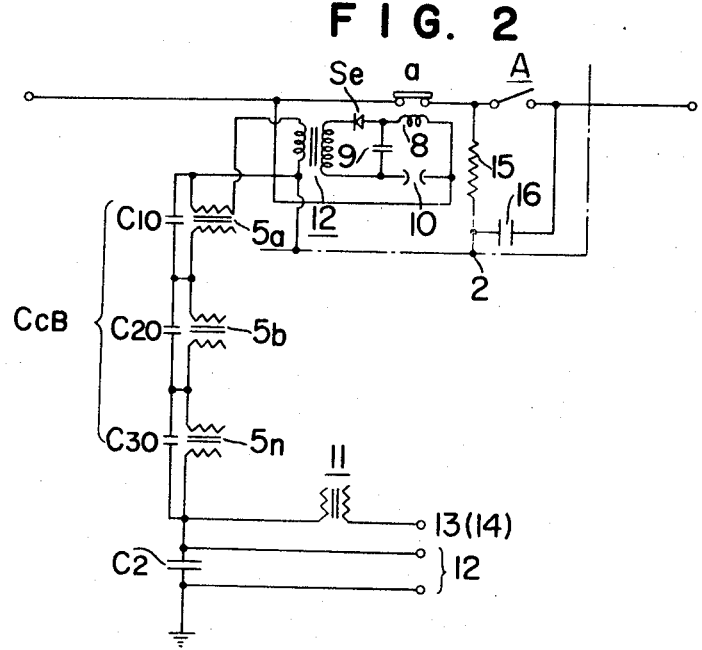
FIG. 2 is an electrical wiring diagram illustrating an essential part of the present invention.
Figure 3:
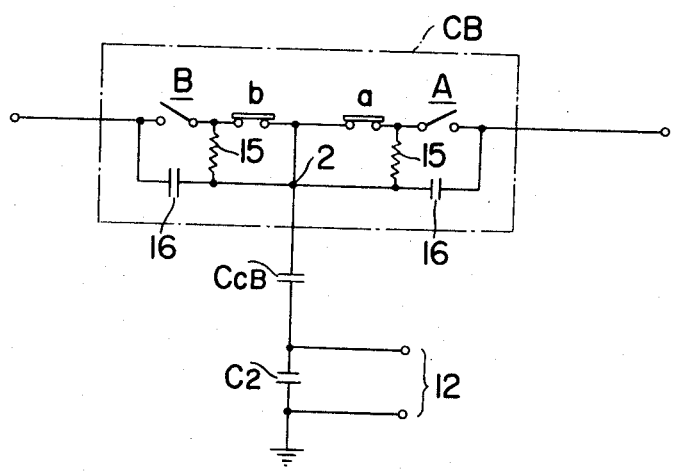
FIG. 3 is a fundamental circuit diagram of a circuit breaker unit.

One end of a winding $5_{al}$ of a transformer $5a$ which is mostly adjacent to the casing 2 is connected to the casing 2, while one ($5_{nl}$) of the windings of a transformer $5_n$ adjacent to the tank 3 is connected to one of the windings of an insulation transformer 11. One end of the winding $5_{nl}$ is grounded through an additional capacitor $C_2$. A terminal 12 is led to a zero point detector shown in FIG. 6, while terminals 13 and 14 are connected to an a.c. power source. A resistor 15 is connected between a high potential conductor and the casing 2, and a capacitor 16 is connected between the casing 2 and a terminal on the power source side of the closing contact A. Thus, according to the circuit breaker constructed as described above, a certain amount of electro-static capacity is provided between the high potential side and the ground potential side by means of the cascade connected transformer. This is illustrated by an electrical wiring diagram shown in FIG. 2, which indicates a unit construction of a circuit breaker. Therefore, the electrical wiring diagram for one circuit breaker which consists of two units can be represented by FIG. 3. Referring to FIGS. 2 and 3, reference symbols $C_{10}$, $C_{20}$ and $C_{30}$ are stray capacities established between the primary windings and the secondary windings of the transformers $5a$, $5b$ and $5n$, respectively. A capacity $C_{CB}$ obtained by series-connecting these capacities is an electrostatic capacity between the high potential portion and the ground potential portion of the circuit breaker unit CB.

Figure 4:
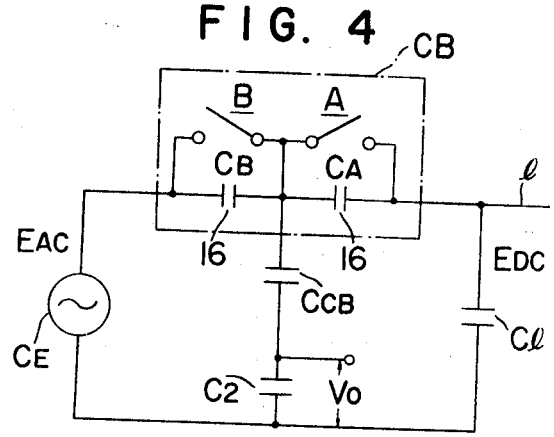
FIG. 4 is a schematic circuit diagram prepared by further omission of a part of the circuit shown in FIG. 3.

FIG. 4 is a diagram illustrating what voltage Vo is obtained between both ends of the capacitor $C_2$ in the case when the circuit breaker having the circuit composition as shown in FIG. 3 is actually connected to a transmission line. For convenience in explanation, FIG. 4 is shown with removal of the breaking contacts $a$ and $b$ and a resistor 15 from FIG. 3.

In FIG. 4, the distributed electrostatic capacity of a transmission line $l$ is represented by a concentrated capacity $C_l$. The capacity $C_l$ is several tenths of $\mu$F with respect to an ordinary line. The capacity of a capacitor 16 ($C_A$ and $C_B$) is selected to be several thousands of pF. $C_{CB}$ and $C_2$ are several hundreds of pF and several $\mu$F in capacity, respectively. In addition, the internal electro-static capacity $C_E$ of a power source $E_{AC}$ is usually larger than several $\mu$F. Accordingly, under conditions that the contacts A and B of the circuit breaker CB are opened as shown in FIG. 4, a voltage across both terminals of the capacitor $C_2$ is represented, in an approximate value, as follows:

$$V_o = K_2 ( \tfrac{1}{2} E_{DC} + \tfrac{1}{2} E_{AC})$$
$$= \tfrac{1}{2} K_2 [E_{DC} - (-E_{AC})]$$

(1)

where: $K_2$ is a voltage-diving ratio determined by capacitors $C_A$, $C_B$, $C_l$, $C_{CB}$, $C_2$ and $C_E$, and $E_{AC}$ is Power Source Voltage, and $E_{DC}$ is residual Voltage of line $l$ when CB is opened and consists of mostly DC component.

Now, if the breaking contacts A and B are opened and no residual charge is left on the line $l$, a voltage waveform appearing across both terminals of the capacitor $C_2$ can be indicated by a curve ($a$) of FIG. 5A. This voltage curve shows a waveform of the power supply voltage $E_{AC}$. If any residual voltage is maintained on the line $l$, said voltage will becomes a voltage based on the voltage $E_{DC}$, as shown by a curve ($b$) of FIG. 5B.

As apparent from the above description; in the circuit breaker unit according to the present invention, the insulation transformer adapted to supply an electric power to the high potential portion, is employed, and the transformer itself has a stray capacities between is windings. Therefore, when the capacitor $C_2$ is series-connected between the ground and one of the windings of a transformer placed on the ground potential side, a certain voltage is induced between both terminals of the capacitor $C_2$. Measurement of the line voltage is achieved by measuring the thus induced voltage. Accordingly, a systematic voltage can be measured without connecting an expensive capacitor type potential transformer to the power source side or the transmission line side. In addition, opened and closed conditions of the contacts A and B can be found by measuring the absolute value of a voltage across both terminals of the capacitor $C_2$, and therefore by utilizing this voltage the switching conditions of the circuit breaker also can be indicated.

In addition to the above, each of the contacts A and B of the circuit breaker according to the present invention is closed by a compressed gas fed from the ground side in accordance with a closing command (not shown) (refer to the specification of U.S. Pat. No. 3,315,056).

Described hereinafter is a way of reclosing the circuit breaker according to the present invention.

As well known, if the circuit breaker is quickly reclosed during the time when a residual charge still remains on the transmission line, an over-voltage which is several times of the normal transmission voltage appears on the line.

Magnitude of this over-voltage depends on relationships between the magnitude of the residual charge and the phase of the power voltage at the time when the circuit breaker is reclosed. However, as found in an extrahigh voltage transmission line, a method of closing the circuit breaker must be designed so that the over-voltage is made small in magnitude as much as possible, because of the economical reasons for reducing an insulation level of the power system as far as possible. For this purpose, a closing method utilizing insertion of a resistor is known as a typical closing method, but this method is unable to essentially eliminate the over-voltage and is a mere counter-measure adapted to suppress the magnitude of the over-voltage in a passive manner.

On the contrary, the closing system described in this invention relates to a system, in which closing is attained in synchronism with the instant when the voltage between both terminals of a circuit breaker is zero or very low, a system of selecting polarity of voltage of a power source to be closed in synchronism with the polarity of the residual voltage, or a system of carrying out closing in synchronism with a specific phase of a power source voltage. According to such synchronous closing system as mentioned above, resistors to be inserted in the case of closing is not required or number of said resistors may be few, thus causing economical structure.

The above-mentioned synchronous closing system can be constructed from a control means adapted for the synchronous closing and a high speed circuit breaker. In this case, the circuit breaker described in connection with FIG. 1 can be used as said high speed circuit breaker. The control means for synchronous closing consists of another control means and a synchronous pulse having a particular phase relation to the phase of the power source system and operates so as to control the circuit breaker so that magnitude of over voltage at the instant of closing the circuit breaker is suppressed. Consequently, a zero detector which achieves a main operation in the control means for synchronous closing will be described hereinbelow.

Figure 6:
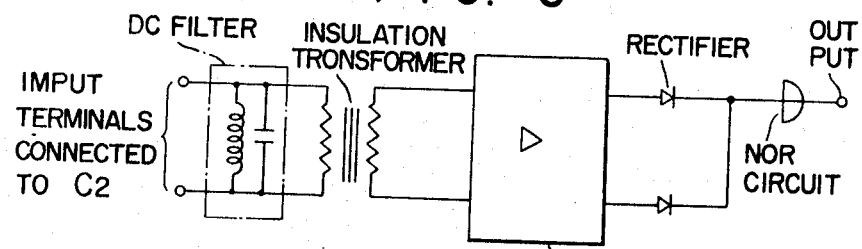
FIG. 6 is a block diagram illustrating a zero-point detector used to detect the zero point of a voltage wave.
Figure 7:
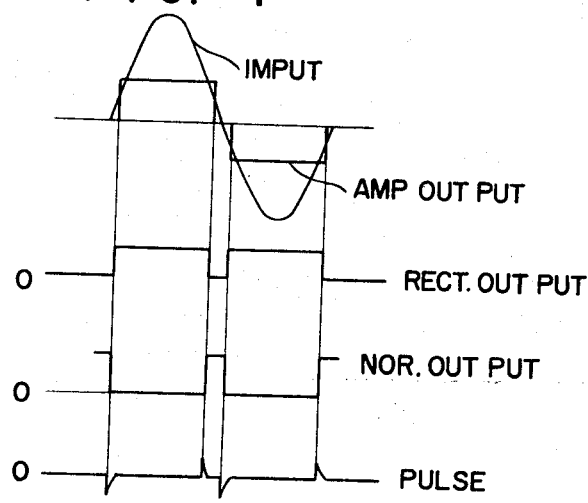
FIG. 7 shows waveforms appearing at various parts of the zero-point detector shown in FIG. 6.

FIG. 6 is an electrical wiring diagram of a zero-point detector, and FIG. 7 shows waveforms appearing at the various parts of the zero-point detector. Referring to FIGS. 6 and 7, an input voltage from the capacitor $C_2$ is applied through a D.C. filter to an insulation transformer and then to an amplifier where the voltage is amplified. The thus amplified voltage is full-wave-rectified, and the thus rectified voltage is applied to an NOR circuit thereby to obtain an output thereof. Therefore, a certain pulse voltage can be obtained by connecting an other known pulse circuit to the output terminal of the NOR circuit. Each phase of each pulse voltage is correspondent to each zero point of A.C. component of the input voltage.

A time period from opening to the reclosing of the circuit breaker is constant, and a reclosing signal is issued by a control device of the system. Therefore, this signal and the output signal from the zero-point detector can be made to be a reclosing signal for the circuit breaker by introducing them to, for instance, an AND circuit. In the circuit breaker, the opening contact is closed after a lapse of a certain closing time from receiving of a reclosing signal, and the time period required for reclosing the opening contact is substantially constant. Consequently, if necessary, a time delay device may be employed so that the opening contact be closed at desired time or at a time when the over-voltage does not occur in the case of reclosing operation, namely at a time when a voltage across both terminals of the circuit breaker becomes zero. For instance, if a circuit breaker requires 3.25 c/s for its reclosing under 50 Hz, in the case of FIG. 5A a time delay of 0.25 c/s (5ms), 0.75 c/s, or 1.25 c/s should be provided for issuing of a reclosing signal.

If a residual charge of a value corresponding to $E_{DC}$ is included as found in the case of FIG. 5B, the terminal voltage of the capacitor $C_2$ encounters the zero point at the time of $t_o$, $t_1$, $t_2$, $t_3$, and so on, whereby internal signals are obtained in the zero-point detector at these times. However, in the case of a zero detector used for a wave having a d.c. component as in the above case, it is required to impart both of D.C. voltage component and A.C. voltage component to the amplifier except D.C. filter and insulation transformer. If the circuit reclosing signal is issued at time $t_f$, the internal signal produced at the time $t_2$ is skillfully utilized thereby to furnish the circuit-reclosing signal to the circuit breaker at said time $t_2$. In this case also, in the same way as described previously, it is possible to decide a predetermined delay time which is determined by a closing time of the circuit breaker on the basis of the internal signal so that reclosing operation of the circuit breaker can be completed by said internal signal at the time instant when a potential difference between both sides of the circuit breaker is not present or very small.

Figure 8:
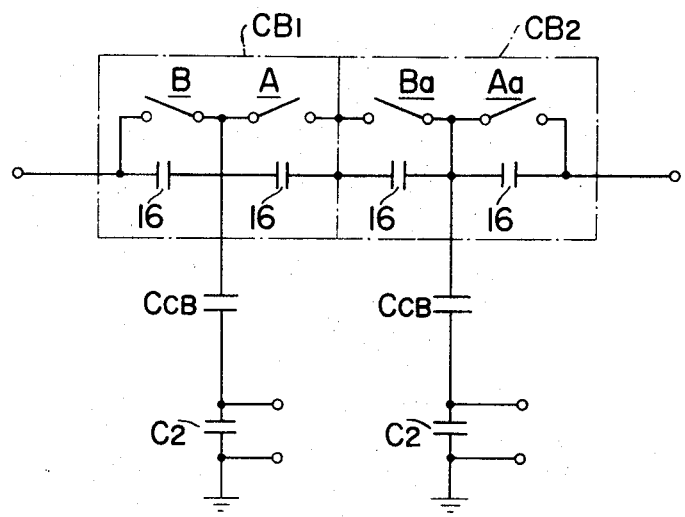
FIG. 8 is a circuit diagram illustrating series-connected circuit breaker units each having the circuit composition shown in FIG 4.

FIG. 8 is an electrical wiring diagram provided for a 500 KV system, which comprises two circuit breaker units $CB_1$ and $CB_2$, the former unit $CB_1$ having breaking points A and B, and the latter unit $CB_2$ having breaking points $A_a$ and $B_a$.

Figure 9:
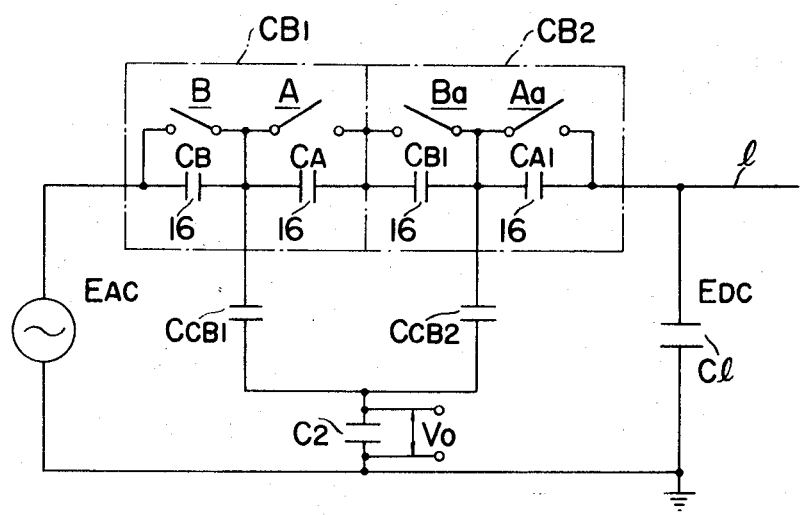
FIG. 9 is an equivalent circuit diagram prepared by changing a part of the circuit diagram shown in FIG. 8.

FIG. 9 is an equivalent circuit diagram illustrating the case where the circuit breaker constructed as shown in FIG. 8 is connected to the system.

Now, if the values of capacitors $C_A$, $C_B$, $C_{A1}$ and $C_{B1}$ are on the order of pF, respectively, both $C_l$ and an internal capacity $C_E$ of a power source $E_{AC}$ can be considered to be of μF unit. Therefore, a voltage $V_o$ across the terminals of the capacitor $C_2$ is represented by the following formula (2):

$$V_o = K_3 (¼ E_{DC} + ¼ E_{AC} + ¾ E_{DC} + ¾ E_{AC})$$
$$= K_3 (E_{DC} + E_{AC})$$
$$= K_3 [E_{DC} - (-E_{AC})] \qquad (2)$$

where: $K_3$ is a voltage-dividing ratio.

$$C_{CB1}, C_{CB2} \ll C_2$$
$$C_A, C_B, C_{B1}, C_{A1} \text{``} C_{CB1}, C_{CB2}$$

Figure 10A:
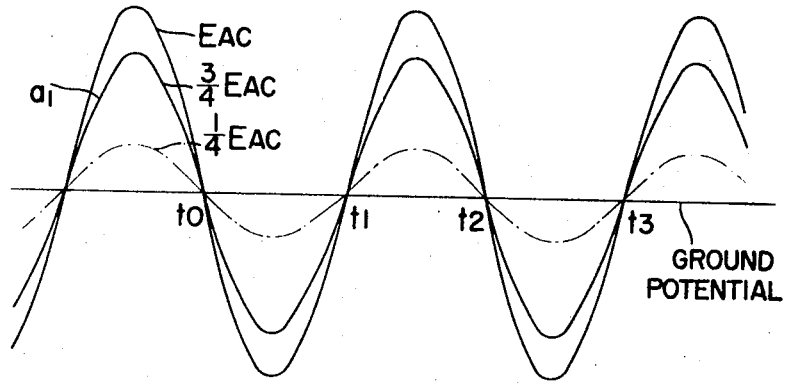
FIG. 10(A) and 10(B) illustrate waveforms used for explanation of the present invention.
Figure 10B:
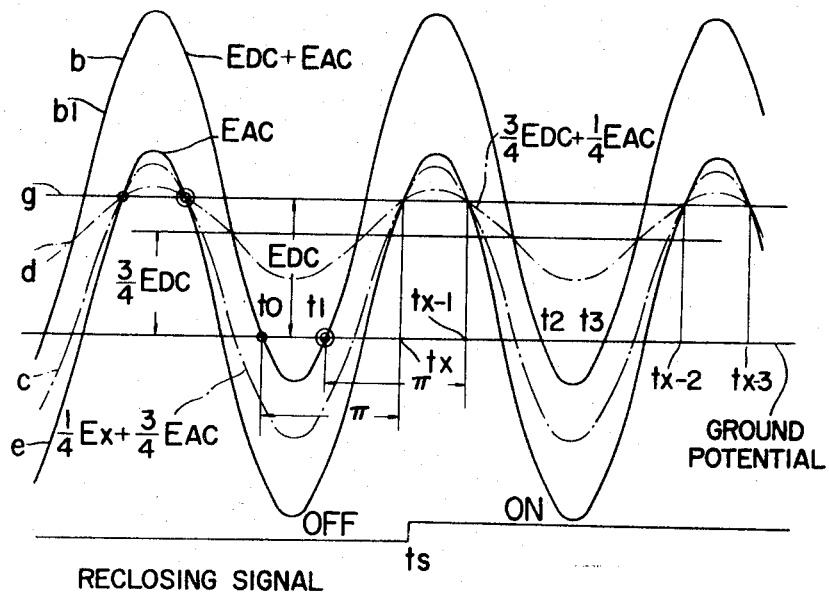

In other words, the residual voltage $E_{DC}$ on a line $l$ is divided by four capacities ($C_{B1}$, $C_{A1}$, $C_B$, and $C_A$) and the thus divided voltage is detected by the capacitor $C_2$, through $C_{CB1}$ and $C_{CB2}$. In the same way, the voltage $E_{AC}$ also is applied to the capacitor $C_2$, through $C_{CB1}$ and $C_{CB2}$. Therefore, their resultant voltage is represented by the above formula (2). Each of these voltages is shown in FIG. 10A. As shown in FIG. 10A, when there is no residual voltage $E_{DC}$ included, the power source voltage $E_{AC}$ is divided by the capacitors $C_{CB1}$ and $C_{CB2}$, so that ¾ $E_{AC}$ is detected through one capacitor $C_{CB1}$ while ¼ $E_{AC}$ is detected through the other capacitor $C_{CB2}$, and their resultant voltage becomes $E_{AC}$ and is represented by a curve $h$.

Next, let's consider the case when the residual voltage $E_{DC}$ is present. In this case, a voltage appearing across both terminals of the capacitor $C_2$ has a value obtained by combining both of a voltage curve (curve $c$) which is obtained by superimposing ¾ $E_{AC}$ on ¼ $E_{DC}$ which are to be divided by $C_{CB1}$, and a voltage (curve $d$) which is obtained by superimposing ¼ $E_{AC}$ on ¾ $E_{DC}$ which are to be divided by $C_{CB1}$, so that said terminal voltage of the capacitor $C_2$ is represented by curve $b_1$ (curves $b$ and $b_1$ are indicated by the same waveform). In other words, the voltage waveform appearing between both terminals of the capacitor $C_2$ is shown by curve $b_1$, and therefore when a voltage having this waveform is applied to the zero-point detector, internal signals can be obtained at each zero point $t_o$, $t_1$, $t_2$, $t_3$ through $t_n$.

In addition, when voltage between both ends of the circuit breaker is considered, on a line side there is a residual voltage represented by a curve $g$, while on the other power source side here is a voltage $E_{AC}$, and therefore a difference voltage therebetween becomes zero at the times of $t_x$, $t_{x-1}$, $t_{x-2}$, $t_{x-3}$ through $t_{x-n}$. Accordingly, if all the breaking points are closed at any of these times, occurrence of an abnormal voltage can be suppressed. Moreover, as apparent from the above formula (2), a time difference between the times, $t_o$ and $t_x$, or, $t_1$ and $t_{x-1}$, is π, because $t_o$, $t_1$, . . . is represented by $V_o = K_3 (E_{DC} + E_{AC})$ according to the equation (2), and the voltage $V_d$ between both terminals of the circuit breaker is represented by the following equation.

$$V_d = E_{DC} - E_{AC}$$

Therefore, an internal signal for each of the times $t_o$, $t_1$, through $t_n$ is kept issued in the zero-point detector, but all the internal signals are ineffective until the zero-point detector receives a closing signal. As shown in the figure, when the closing signal is applied to the detector at a time $t_s$, the internal signals produced after this time $t_s$, in other words, the internal signals produced at the times $t_2$ and $t_3$ become effective, and the circuit-reclosing operation is effected at the times $t_{x-2}$, $t_{x-3}$ through $t_{x-n}$ which are delayed by $(\pi + 2n\pi)$ from said internal signals.

As obvious from the above description, a synchronous closing operation can be accomplished with the circuit structure as illustrated in FIG. 4 or 9. It should be noted that in any of these circuit structures a capacitor type potential transformer P.D. on the power source side and a coupling capacitor on the line side can be omitted. Furthermore, as $C_{CB}$ is a stray capacity of the cascade connected type insulation transformer, the capacitor $C_2$ can be connected to each of the circuit breaker units in the case where two circuit breaker units are connected in series as shown in FIG. 8. Therefore, by utilizing a voltage across both terminals of the capacitor $C_2$ on one of the circuit breaker units, the circuit breaker is closed in a synchronous manner. This synchronous closing may be modified so that the closing is carried out in synchronism with a specific phase of the power source voltage, or in synchronism with a polarity of the power source voltage, said polarity being in phase with the polarity of the residual voltage, and a similar voltage obtained from the other circuit breaker unit can be used for measurement of the system voltage. In addition, a control voltage for the circuit breaker itself, namely, the voltage across both terminals of the capacitor $C_2$ can be picked up from a part of the constructional elements of the circuit breaker itself. Accordingly, the circuit breaker of the present invention has an advantage that it hardly has such dangerous conditions that the closing operation is erroneously carried out by a voltage induced from external parts other than the circuit breaker, for instance, by a surge voltage.

In the conventional construction of the circuit breaker, when the voltage between circuit breaker is to be measured, two capacitor type potential transformers P.D. must be connected to both terminal of the circuit breaker, and yet the capacitor type potential transformers P.D. adapted to measure a voltage of one power source side should not always installed nearby the circuit breaker. Therefore, the circuit breaker with such conventional construction has a disadvantage such that a control cable is laid over a considerably long distance for measurement of the voltage between circuit breaker and as a result of which the measured voltage is strongly influenced by the external induction voltage.

Figure 11:
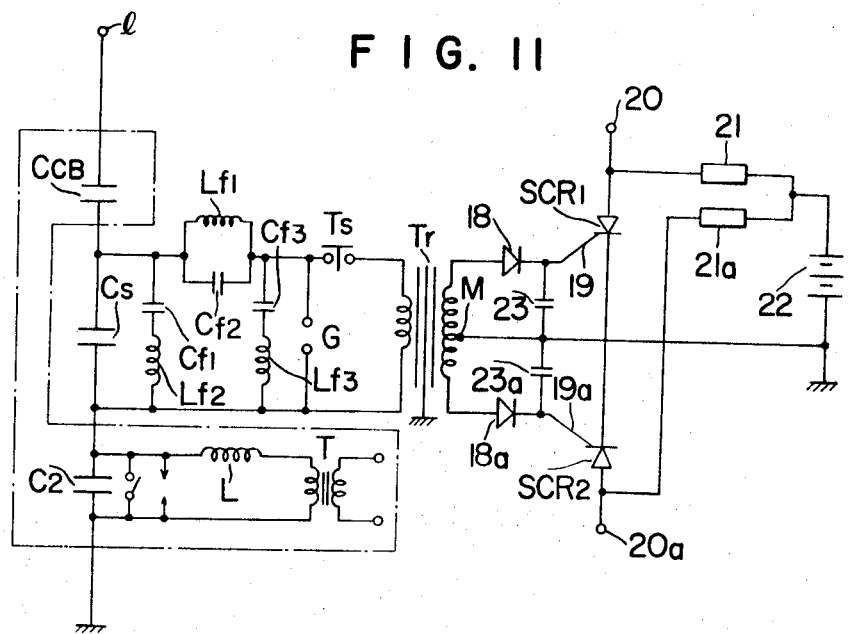
FIGS. 11 and 12 are circuit diagrams illustrating different residual voltage detectors according to the invention, respectively.
Figure 12:
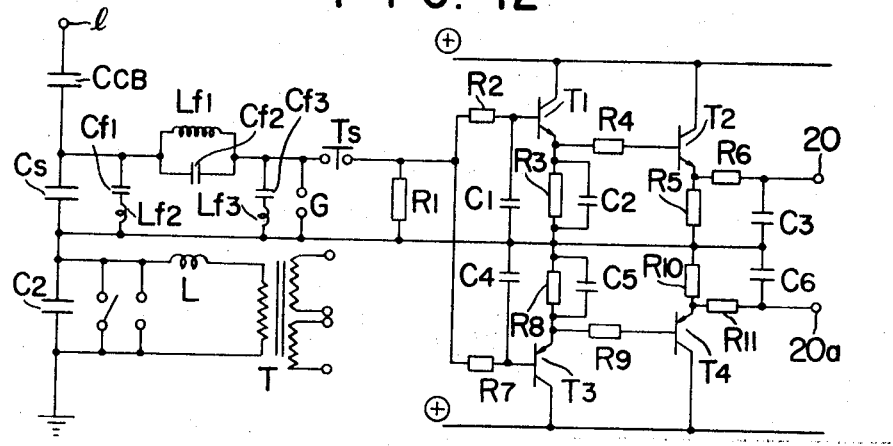

FIGS. 11 and 12 illustrate different embodiments of the residual voltage detector composed according to the principle of the present invention.

Referring now to FIG. 11, a capacitor $C_s$ for residual voltage measurement is connected in series to a capacitor $C_2$ and further to $C_{CB}$ of the circuit breaker unit. Parts represented by reference symbols $L_{f1}$ to $L_{f3}$ and $C_{f1}$ to $C_{f3}$ compose a d.c. filter adapted to detect the d.c. voltage component of a capacitor $C_s$.

An abnormal voltage prevention means such as a spark gap means G and a primary winding of a pulse transformer $T_r$ (through a control contact $T_s$) are connected to both terminals of the capacitor $C_s$, respectively. The iron core of the pulse transformer $T_r$ is shield to remove the influence or an electrostatic surge. Referring to the discharge time constant of a capacitor, the reduction of leakage resistance due to pollation of external terminals rather than internal time constant becomes an important problem, and therefore attention must be paid to all of the control contact $T_s$, pulse transformer $T_r$, and terminals and wiring leads of the capacitor $C_s$.

Connected to the secondary winding to the pulse transformer $T_r$ are gate circuits 19 and 19a of the silicon-controlled rectifiers (which will be abbriviated as SCR$_1$ and SCR$_2$ hereinafter) which are reversely connected to each other through rectifiers 18 and 18a, respectively. Output terminals 20 and 20a are connected to one terminal of an electric source 22 through resistors 21 and 21a, respectively. The negative side of the electric source 22 is also connected to the neutral point M of the pulse transformer $T_r$ and is grounded. Reference symbols 23 and 23a represent capacitors for protection.

Now, when a closing signal is issued to the circuit breaker, the control contact $T_s$ is closed, whereby the charge of the capacitor $Cs$ is applied to the pulse transformer $T_r$. One of the silicon-controlled rectifiers SCR$_1$ or SCR$_2$ becomes conductive in accordance with polarity of the charge in the capacitor $C_S$ at the time when the control contact $T_s$ is closed. If the SCR is maintained so that a current greater than its holding current flows therethrough, the thus maintained condition of the SCR is held as it is until the current is cut off. In other words, the polarity of the residual charge of the system can be known by detecting the fact that either SCR$_1$ or SCR$_2$ is conductive. When a signal to be applied to a closing valve (not shown) of the circuit breaker is controlled in accordance with the thus detected polarity, the closing operation can be achieved without causing any closing surge voltage. In addition, the same operation as described above can be realized by using a transistor circuit in place of the SCR circuit.

When it is required to know a residual charge voltage, it is readily consider to provide a method in which several stages of quantity detection circuits are provided in accordance with a voltage level so that a residual charge quantity is classified by the operational limit of the circuit and a method in which, possitively, a potential of the capacitor Cs is introduced to a transistor circuit thereby to register the potential therein. FIG. 12 illustrates one embodiment of the circuit, in which the same parts are designated by the same references.

As apparent from the above description, the most important thing in determination of the polarity or voltage value of the residual charge on the line depends on the construction of the detection terminal where data proportional to the residual charge are picked up. The present invention intends to embody the detection terminal by adding a third capacitor to the capacitor type potential transformer provided in every circuit breaker unit. Now, if it is assumed to aim at obtaining 100 V as a secondary conversion voltage, with a transmission line voltage 303 kV/ (=525 kV/ $\sqrt{3}$); as the value of the main capacitor $C_{CB}$ is usually several hundreds of pF, a capacity necessary for $C_s$ to be inserted in case of 500 pF $C_{CB}$ is as follows:

$$500 \text{ pF} \times (303\text{kV})/(100\text{V}) = 1.52 \text{ [}\mu F\text{]}$$

In addition to the above, with respect to the terminal voltage of $CS$, when discharge time constants of $C_{CB}$ and $C_s$ different and discharge time constant of residual charge of the line is long, the residual voltage does not conform to a voltage ratio determined by a capacity ratio of $C_{CB}$ to $C_s$ with a lapse of time and is finally determined by a resistance type potential division, and therefore there is possibility of the abnormal increment of the voltage of $Cs$. In this case, a protective countermeasure is necessary, for instance, a discharge tube or the like is provided on the terminals of the capacitor Cs so that whenever the voltage increases abnormally up to its discharge-starting voltage, said discharge tube is discharged thereby to reduce the terminal voltage of the capacitor $C_s$ to a minimum discharge-sustaining voltage. In such case, it is impossible to measure the voltage value of the residual charge any longer.

The terminal voltage of the capacitor $C_s$ is much lower than the line potential, so that any trouble would not occur by addition of another $C_s$ thereto. However, when a high accuracy measurement is required, the voltage ratio should be preferably, adjusted somewhat as required.

Moreover, in a power line carrier wave device in which a passage e is used as a transmission line, a coupling capacitor may be used in the same way. In other words, if the capacitor $C_s$ and detector for voltage measurement as shown in FIG. 11 or 12 are added to the ground side of the coupling capacitor, the completely same functions can be expected.

Figure 13:
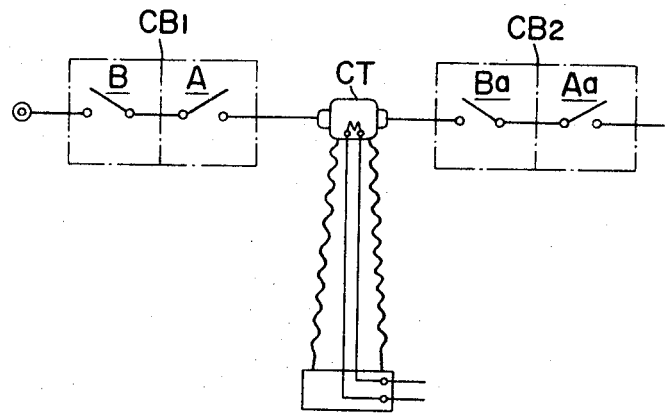
FIGS. 13 and 14 are a schematic circuit diagram and its electrical wiring diagram, respectively, in the case where a technical principle of the present invention is developed whereby a current transformer is employed in place of an insulation transformer.
Figure 14:
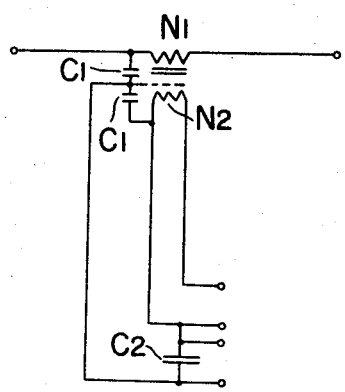

FIG. 13 is a schematic diagram illustrating the case where a current transformer CT is connected between both circuit breaker units $CB_1$ and $CB_2$ which form a circuit breaker assembly. In this electrical wiring diagram, there is a stray capacity $C_1$ between a primary winding $N_1$ and a secondary winding $N_2$ as shown in FIG. 14. The stray capacity $C_1$ is similar to the stray capacity $C_{CB}$ of the transformer as described with reference to FIG. 2. Therefore, by connecting a capacitor $C_2$ to the stray capacity $C_1$ the system voltage can be measured in the same manner as explained referring to FIG. 2.

The circuit breaker disclosed as an embodiment of the present invention has no necessity of using a special capacitor, because the cascade type insulation transformer has a predetermined electrostatic capacity between the high potential side and the ground potential side when an electric power is supplied as described above.

However, a usual circuit breaker other than the circuit breaker having such a construction as described above can be made to carry out the reclosing operation as defined by the principle of the present invention in the case when in the usual circuit breaker a proper electrostatic capacity is additionally provided between the high potential side and the ground side. In this case, even though the additional capacitor is enclosed in the supporting porcelain of the circuit breaker or in another supporting porcelain different from the supporting porcelain of the circuit breaker and the thus enclosed capacitor is connected between the high potential side and the ground side, the capacitor will functions in the same way.

As obvious from the above description, according to the present invention the voltage measurement and reclosing operations with respect to the extra high voltage system can be achieved economically and reasonably.

It is intended that all matters contained in the foregoing description and in the drawings shall be interpreted as illustrative only not as limitative of the present invention.

In all circuit breakers mentioned above, the opening portions having a high potential are insulated by means of insulators as shown in FIG. 1. However, the concept of this invention can be easily applied for to so-called Died Tank type circuit breaker in which the opening parts, members 4a, 4b, a, A and others are provided at the ground potential. In this circuit breaker also, the same function as described already can be expected.

We claim:

1. A circuit breaker comprising an insulation transformer provided therein and adapted to supply an electric power from a ground potential portion to a control device placed on a high potential portion; a capacitor which is connected so as to electrically compose a series circuit with a stray electrostatic capacity present between the ground potential portion and the high potential portion of said insulation transformer; and means adapted to detect a voltage produced between both terminals of said capacitor, thereby to measure a system voltage.

2. A circuit breaker according to claim 1, which comprises additionally a synchronous control device which employs as its input said voltage between both terminals of said capacitor so that the circuit breaker can be closed with a particular phase and polarity of the system voltage.

3. A circuit breaker according to claim 1, in which the circuit breaker consists of at least two circuit breaker units series-connected with respect to the line, each of said units causing a first voltage and a second voltage between both terminals of said capacitor, said first voltage being utilized to carry out a synchronous closing of the circuit breaker, and said second voltage being utilized to measure the system voltage.

4. A circuit breaker according to claim 2, in which a contact to be closed by a closing signal is connected in series to one of both terminals of said capacitor at the position between a synchronous control device and said capacitor, whereby the synchronous control device is made to be operated by the closing operation of said contact.

5. A circuit breaker according to claim 2, in which a detector adapted to detect the polarity of a residual voltage on the line is connected to both terminals of said capacitor, said detector having an output contact causing operation of the synchronous control device, thereby to close the circuit breaker, with a particular voltage polarity.

6. A circuit breaker according to claim 2, in which there are provided three kinds of timing elements adapted to automatically correct a synchronous closing point variation caused by frequency variation on transmission power system.

7. A circuit breaker according to claim 2, in which said capacitor is provided with another capacitor connected in series thereto, an output voltage produced across both terminals of said another capacitor being utilized to measure the system voltage or to carry out a switching indication.

8. A circuit breaker which comprises a current transformer connected to a transmission line surrounded at both sides by a breaking contact and adapted to supply a current from said transmission line to a control device placed at the ground potential portion, a capacitor which is connected so as to electrically compose a series circuit with a stray electrostatic capacity present between the ground potential portion and the high potential portion of said current transformer, and means adapted to detect a voltage produced between said terminals of said capacitor thereby to measure a system voltage.

* * * * *